US010286954B2

(12) United States Patent
Klinger et al.

(10) Patent No.: US 10,286,954 B2
(45) Date of Patent: May 14, 2019

(54) DEVICE FOR ADJUSTING CAMBER AND/OR TOE OF A VEHICLE WHEEL (71) Applicant: AUDI AG, Ingolstadt (DE)

(72) Inventors: Thomas Klinger, Ingolstadt (DE); Wolfgang Schmid, Freising (DE); Heinrich Beringer, Denkendorf (DE); Achim Glas, Gaimersheim (DE); Ulrich Voll, München (DE); Michael Braumandl, Allershausen (DE); Vincent Pourroy-Solari, Thones (FR)

(73) Assignee: Audi AG, Ingolstadt (DE)

( * ) Notice: Subject to any disclaimer, the term of this patent is extended or adjusted under 35 U.S.C. 154(b) by 120 days.

(21) Appl. No.: 15/329,171

(22) PCT Filed: Jun. 22, 2015

(86) PCT No.: PCT/EP2015/001256
§ 371 (c)(1),
(2) Date: Jan. 25, 2017

(87) PCT Pub. No.: WO2016/015801
PCT Pub. Date: Feb. 4, 2016

(65) Prior Publication Data
US 2017/0217492 A1    Aug. 3, 2017

(30) Foreign Application Priority Data

Jul. 26, 2014    (DE) .................. 10 2014 011 110

(51) Int. Cl.
*B62D 17/00*    (2006.01)
*B60G 17/015*    (2006.01)
*B60G 17/016*    (2006.01)

(52) U.S. Cl.
CPC ......... *B62D 17/00* (2013.01); *B60G 17/0152* (2013.01); *B60G 17/0164* (2013.01);
(Continued)

(58) Field of Classification Search
CPC ................ B62D 17/00; B60G 17/0152; B60G 17/0164; B60G 2206/50; B60G 2202/42;
(Continued)

(56) References Cited

U.S. PATENT DOCUMENTS 7,712,748 B2 * 5/2010 Deal ...................... B60G 3/01
280/124.135
8,322,729 B2   12/2012 Michel et al.
(Continued)

FOREIGN PATENT DOCUMENTS

DE           39 28 135 A1    3/1990
DE    10 2004 049 296 A1    4/2006
(Continued)

OTHER PUBLICATIONS

International Search Report issued by the European Patent Office in International Application PCT/EP2015/001256.

*Primary Examiner* — Darlene P Condra
(74) *Attorney, Agent, or Firm* — Henry M. Feiereisen LLC (57) ABSTRACT A device for adjusting camber and/or toe of a vehicle wheel of a motor vehicle, includes a wheel carrier including a wheel-side carrier part, an axle-side guide part and rotary parts arranged between the wheel-side carrier part and the axle-side guide part, the rotary parts being supported on a common bearing site for rotation relative to each other about a rotation axis, the wheel-side carrier part being rotatable about said rotation axis about an instantaneous center of rotation for toe or camber adjustment of the vehicle wheel and supporting a brake caliper interacting with a brake disc of the vehicle wheel; and a torque bridge configured as a torque transmission element which supports the wheel-side carrier part on the axle-side guide part when a braking moment acts on the wheel-side carrier part during a braking process, and which when supporting the wheel-side carrier
(Continued)

part on the axle-side guide part generates a directed force component with which the wheel-side carrier part is impingable.

23 Claims, 6 Drawing Sheets

(52) U.S. Cl.
CPC .... *B60G 2200/46* (2013.01); *B60G 2200/462* (2013.01); *B60G 2200/4622* (2013.01); *B60G 2202/42* (2013.01); *B60G 2206/50* (2013.01); *B60Y 2300/02* (2013.01); *B60Y 2400/405* (2013.01)

(58) Field of Classification Search
CPC .......... B60G 2200/462; B60G 2200/46; B60G 2200/4622; B60Y 2400/405; B60Y 2300/02
See application file for complete search history.

(56) References Cited

U.S. PATENT DOCUMENTS

| | | | |
|---|---|---|---|
| 8,474,837 B2 | 7/2013 | Meitinger et al. | |
| 8,490,983 B2 | 7/2013 | Schmid et al. | |
| 8,500,133 B2 | 8/2013 | Michel et al. | |
| 8,534,684 B2 | 9/2013 | Michel et al. | |
| 8,731,780 B2 | 5/2014 | Michel et al. | |
| 8,801,107 B2 | 8/2014 | Schmid et al. | |
| 8,857,921 B2 | 10/2014 | Schmid et al. | |
| 8,886,400 B2 | 11/2014 | Kossira et al. | |
| 8,894,077 B2 | 11/2014 | Michel et al. | |
| 8,983,728 B2 | 3/2015 | Kossira et al. | |
| 9,108,482 B2 | 8/2015 | Mohrlock et al. | |
| 9,321,323 B2 | 4/2016 | Schindler et al. | |
| 9,381,934 B2 | 7/2016 | Ulrich et al. | |
| 9,393,848 B2 | 7/2016 | Mohrlock et al. | |
| 9,393,911 B2 | 7/2016 | Pfeiffer et al. | |
| 9,446,653 B2 | 9/2016 | Schindler et al. | |
| 2010/0078910 A1* | 4/2010 | Mueller | B60G 7/006 280/93.503 |
| 2010/0090431 A1* | 4/2010 | Aramah | B60G 3/26 280/124.106 |
| 2012/0098221 A1* | 4/2012 | Michel | B60G 3/01 280/86.751 |
| 2012/0132020 A1 | 5/2012 | Kunsch et al. | |
| 2012/0193882 A1* | 8/2012 | Michel | B60G 7/006 280/86.751 |
| 2012/0306174 A1 | 12/2012 | Schmid et al. | |
| 2013/0099455 A1 | 4/2013 | Beringer et al. | |
| 2013/0175776 A1 | 7/2013 | Michel et al. | |
| 2014/0110996 A1 | 4/2014 | Klinger | |
| 2015/0375588 A1* | 12/2015 | Czerr | B60G 3/202 280/124.135 |
| 2016/0167709 A1* | 6/2016 | Pfeiffer | F16D 41/105 280/86.751 |

FOREIGN PATENT DOCUMENTS

| | | |
|---|---|---|
| DE | 10 2008 048 568 A1 | 3/2010 |
| DE | 10 2009 006 903 A1 | 8/2010 |
| DE | 10 2009 021 093 A1 | 11/2010 |
| DE | 10 2009 058 489 A1 | 6/2011 |
| EP | 2 165 862 A1 | 3/2010 |
| EP | 2 536 579 B1 | 12/2012 |
| WO | WO 2011/020534 A2 | 2/2011 |

* cited by examiner

Fig. 4
Section I-I

DEVICE FOR ADJUSTING CAMBER AND/OR TOE OF A VEHICLE WHEEL

CROSS-REFERENCES TO RELATED APPLICATIONS

This application is the U.S. National Stage of International Application No. PCT/EP2015/001256, filed Jun. 22, 2015, which designated the United States and has been published as International Publication No. WO 2016/015801 and which claims the priority of German Patent Application, Serial No. 10 2014 011 110.5, filed Jul. 26, 2014, pursuant to 35 U.S.C. 119(a)-(d).

BACKGROUND OF THE INVENTION

The invention relates to a method for adjusting camber and/or toe of a motor vehicle wheel according to the preamble of patent claim 1.

From DE 10 2009 058 489 A1 a generic device is known in which a wheel carrier for a vehicle wheel is configured multipart, i.e., with a wheel-side carrier part and an axle-side guide part and with rotary parts arranged there between. In the wheel-side carrier part a wheel bearing is integrated in which a wheel hub section of a wheel flange, which carries the vehicle wheel, can be articulately connected. The rotary parts arranged there between interact with slanted surfaces, which define a rotation axis of the wheel-side rotary part, which is slanted toward the rotation axis of the axle-side rotary part. In this way when at least one of the rotary parts is driven to rotate the wheel-side carrier part can be pivoted about an instantaneous center of rotation for toe or camber adjustment of the vehicle wheel.

In a braking procedure the braking forces and braking moments generated by the brake system are conducted to the vehicle superstructure via the wheel carrier, which poses the risk of an inadvertent influence on the camber and/or toe behavior of the wheel carrier. Thus during a braking procedure the wheel-side carrier part is impinged with a braking moment via the brake caliper, which is in braking engagement. In order to avoid introduction of the braking torque into the two rotary parts the wheel-side carrier part in DE 10 2009 058 489 A1 is supported on the axle-side guide part via a torque bridge i.e., a universal shaft.

SUMMARY OF THE INVENTION

In addition during the braking process forces and moments act on the vehicle wheel, which poses the risk of an inadvertent influence on the camber and/or toe behavior of the wheel carrier. An example is a longitudinal braking force moment, which acts on the vehicle wheel with which a longitudinal moment which acts on the vehicle wheel is generated, which pushes the vehicle wheel in the direction of the toe-out. Another example is the brake pitching compensation. Such a brake pitching compensation results when the braked vehicle performs a movement about the vehicle transverse axis due to its inertia, i.e., a dipping of the front region. In this case a vertical brake force component acts on the vehicle wheel with which a vertical moment acting on the vehicle wheel is generated, which leads to a change of the camber moment at the actuator of the rotary parts.

These exemplary vertical and longitudinal moments add up (potentially with other moments occurring during braking) to a total vehicle wheel moment, which acts as a reaction moment on the rotary parts. The reaction moment directly acts on the rotary drive of the rotary parts and does not necessarily have to be identical with the total vehicle wheel moment. Rather the reaction moment can be different from the total vehicle wheel moment, i.e., depending on the actual rotary positions of the rotary parts and/or the actual position of the inclined plane formed between the rotary parts, among other things.

In order to prevent an unintended rotary adjustment of the rotary parts resulting from the total vehicle wheel moment acting on the rotary parts, in the state of the art the rotary drive of the wheel-side and the axle-side rotary part has to provide an oppositely directed compensation moment. For this purpose corresponding constructive measures have to be taken at the rotary drive for example in order to configure the rotary drive self-inhibiting or control measures have to be taken in order to generate the compensation torque by driving the rotary drive.

The object of the invention is to provide a device in which during a braking maneuver a change of a camber and/or toe can be automatically reduced without intervention of the rotary drive of the rotary parts.

The object is solved by the features of the independent patent claim. Preferred embodiments of the invention are set forth in the dependent claims.

According to the characterizing portion of the independent patent claim the torque bridge between the wheel-side carrier part and the axle-side guide part is configured as a torque transmission element, which upon support of the carrier part that is impinged with the brake torque on the guide part, generates a force component with which the wheel-side carrier part is impinged during the braking process. The torque transmission element thus converts the braking torque into the force component. By means of the force component an unintended steering of the wheel-side carrier part due to kinetic properties of the wheel carrier can be prevented during the braking process, which otherwise would lead to an unintended change of camber or toe of the vehicle wheel during the braking process.

The torque transmission element can be of arbitrary design. For reducing required mounting space it is advantageous when the torque transmission element is at least one coupling rod, which can absorb pulling and also compression forces. The coupling rod can be articulately connected respectively on a wheel-side instantaneous center of rotation at the wheel-side carrier part and on an axle-side instantaneous center of rotation on the axle-side guide part. Conventional torque bridges, for example a universal shaft or a metal bellow, are configured solely with a proper brake torque support in mind, i.e., torsion stiff with regard to the wheel axel but sufficiently resilient in order to not adversely affect the pivot movement of the wheel-side rotary part with carrier part coupled thereon. Such a torque bridge, however is not capable to act with the above-mentioned targeted force component on the wheel-side carrier part.

The coupling rod is hereby arranged between the wheel-side carrier part and the axle-side guide part so that the coupling rod is seized there between upon exertion of the brake torque, i.e., at its wheel-side instantaneous center of rotation the coupling rod impinges the wheel-side carrier part with the targeted force component. The wheel-side and axle-side connection points of the torque transmission element, i.e., the coupling rod are preferably not oriented aligned with each other in transverse direction of the vehicle by purely exemplarily are spaced apart from each other in the vehicle longitudinal direction by a longitudinal offset. In this way during the braking process the carrier part is impinged with the directed force component with which inter alia a camber moment change can be reduced which results from the brake pitching compensation.

As an alternative to a rigid coupling rod the torque bridge can also be at least one (or more) coupling member that can only absorb tensile forces but not compressive forces, for example a chain or a pull strap.

The exact position of the attachment sites of the torque transmission element depends on the geometric conditions of the wheel carrier. Knowing the invention the person skilled in the art can determine the exact position of the attachment sites directly and unequivocally by using the relevant literature (for example the text book "joints and joint shafts" of Schmelz, Seherr-Thoss, Aucktor). For example the positions of the attachment sites K1, K2 of the torque transmission element can be determined so that within the complete movement space of the vehicle wheel, i.e., for example within a toe angle range of +/−6.5 and within a camber angle range between −5 and +2.5 the residual reaction moment, which during the braking procedure acts on the rotary parts, is as small as possible. The residual moment is calculated from the difference between the counter holding moment exerted by the torque transmission element and the mentioned total vehicle wheel moment.

Important for the positioning of the attachment sites are their distances to the center of rotation in the spatial directions. In an exemplary preferred embodiment, when viewed in vehicle transverse direction, the attachment sites can be positioned within the instantaneous center of rotation. In addition when viewed in vehicle longitudinal direction the attachment sites can be positioned in front of or behind the instantaneous center of rotation. In vehicle vertical direction the attachment sites can also be positioned offset relative to the instantaneous center of rotation. Thus, when viewed in vehicle transverse direction the attachment sites may not be oriented behind each other but can be spaced apart from each other by a distance in vehicle longitudinal direction.

In a preferred technical realization the wheel-side carrier part of the wheel carrier can be supported on the wheel-side rotary part via a rotary bearing. In addition in the wheel-side rotary part a wheel bearing can be integrated. In the wheel bearing a wheel hub section of a wheel flange, which carries the vehicle wheel is rotatably supported. In this case the wheel-side carrier part only carries the brake caliper and optionally the drive motor for the wheel-side rotary part. As a result the baring site between the wheel-side rotary part and the wheel-side carrier part is removed from the force flux and is relieved of forces. This leads to the fact that only three bearing sites are still arranged in series in the wheel force flux. The fourth bearing site, i.e., the rotary bearing between the wheel-side carrier part and the wheel-side rotary part on the other hand can be configured smaller because the forces and moments acting on the rotary bearing are much smaller. In addition as a result of the absence of the fourth bearing site from the wheel force flux the camber stiffness of the bearing group is increased, which makes it possible to configure the remaining bearing sites smaller, again with unchanged camber stiffness. Overall compared to the state of the art the required mounting space and the component weight is significantly reduced.

Preferably the wheel-side carrier part can be arranged radially outside the wheel-side rotary part, which allows configuring the device particularly compact in axial direction. In this case the carrier part can be supported on a radially outer bearing sheath surface of the wheel-side rotary part via a radially inner bearing sheath surface with interposition of the rotary bearing.

The axle-side rotary part and the wheel-side rotary part can respectively be drivingly connected with a drive motor. Preferably the rotary parts can each be parts of a gear drive, in which the electric motor drives the axle-side and/or wheel-side rotary part via a gear stage. Rotation of the rotary parts in the same direction or in opposite directions results in a pivoting of the carrier part by a predetermined toe and/or camber angle. An arrangement which is particularly advantageous with regard to the required mounting space results when the wheel-side rotary part has a gearwheel section, which is a part of the above-mentioned gear drive and when viewed in axial direction is arranged between the carrier part support site and the slanted surface of the wheel-side rotary part.

In order to enable a simple integration of the device in a conventional wheel suspension during manufacture the wheel carrier can have an axle-side guide part. On the axle-side guide part the control arm of the wheel suspension of the vehicle can be attached. In addition the guide part can be movement-coupled i.e., it can be supported on the axle-side rotary part via a rotary bearing. Similar to the wheel-side carrier part the guide part can be arranged radially outside the axle-side rotary part. In this case the guide part can be supported on the axle-side rotary part via a radially inner bearing site.

The embodiments and/or refinements of the invention explained above and/or disclosed in the dependent claims can be used individually or in any combination with each other—except for example in cases of clear dependencies or irreconcilable alternatives.

BRIEF DESCRIPTION OF THE DRAWING

In the following the invention and its advantageous embodiments and refinements and its advantages are explained in more detail by way of drawings.

It is shown in.

DETAILED DESCRIPTION OF PREFERRED EMBODIMENTS

Figure 1:
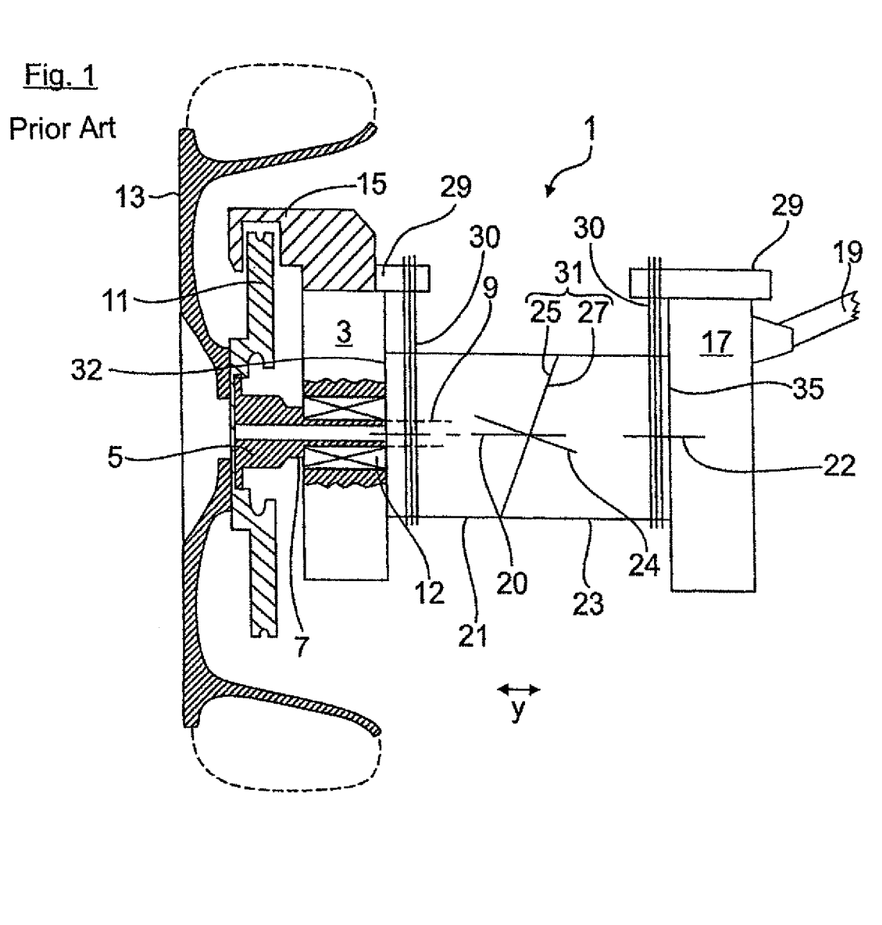
FIG. 1 a schematic representation of the device for adjusting toe and camber angle of a motor vehicle wheel.

In order to facilitate understanding of the invention FIG. 1 shows a strongly schematic representation of a wheel carrier 1 of a vehicle wheel 13 known from the state of the art, which is not part of the invention.

The wheel carrier 1 has a carrier part 3 in which a wheel flange 5 is rotatably supported with its hub section 7 in a wheel bearing 12. On the wheel flange 5 a brake disc 11 and a vehicle wheel 13 is mounted with its wheel rim. The brake disc 11 together with a brake caliper 15 mounted on the carrier part 3 is a part of the brake system. Extending through the wheel carrier 1 is an articulated shaft which drives the vehicle wheel 13 and on whose constant velocity joint (only shown in FIGS. 2 to 4 with reference numeral 9)

an also not shown central screw is screwed, with which the wheel bearing 12 is clamped via the wheel hub 5 and the constant velocity joint 9.

The wheel carrier 1 also has a guide part 17 on which in FIG. 1 exemplarily a control arm 19 of the wheel suspension is articulately connected. Between the carrier part 3 and the guide part 17 two rotary parts 21, 23 are provided as actuating elements. The rotary part 21 is rotatably connected with the carrier part 3 at a bearing site 32 so as to define a rotary part axis 20. The rotary part 23 is connected with the guide part 17 at a bearing site 35 and defines a rotation axis 22. In FIG. 1 the two rotary parts 21, 23 are connected with each other via even, slanted surfaces 25, 27 in a sliding bearing and are rotatable relative to each other via a rotation axis 24. The rotation axis 24 in FIG. 1 is oriented perpendicular to the slanted surfaces 25, 27 and is oriented inclined at a defined angle relative to the rotation axis 22 of the axle-side rotary part 23.

In FIG. 1 the rotary part axis 20 coincides with the wheel axis. However, thereto the rotary part 21 may alternatively not be arranged coaxial to the wheel axle as shown in FIG. 1 but the rotary part axis 20 and the wheel axle can be arranged inclined relative to each other.

On the carrier part 3 as well as on the guide part 17 a respective electric actuating motor 29 is provided, which is drivingly connected with the rotary parts 21, 23 via gear drives 30. By means of the actuating motors the two rotary parts 21, 23 can be rotated in the same direction or opposite directions in both directions of rotation, whereby the carrier part 3 performs a pivot movement or tumbling movement relative to the guide part 17 about an instantaneous center of rotation MP (FIGS. 2 to 5) and thus correspondingly changes the toe angle and/or the camber angle of the vehicle wheel 13.

In FIG. 1 thus the bearing site 32 is formed between the wheel-side carrier part 3 and the wheel-side rotary part 21, the bearing site 31, consisting of the two slanted surfaces 25, 27 between the two rotary parts 21, 23 and a further bearing site 35 is formed between the axle-side rotary part 23 and the guide part 17.

Figure 2:
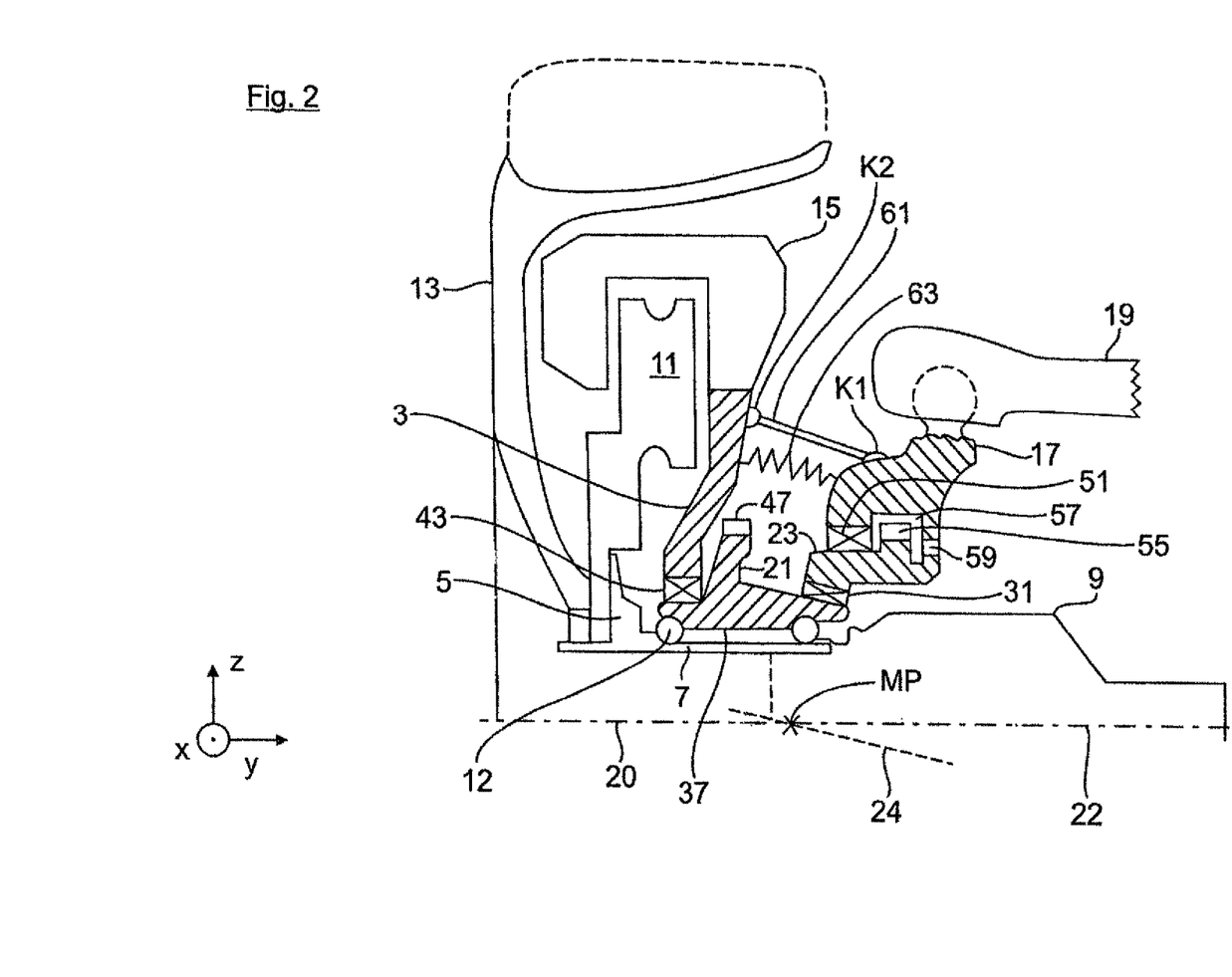
FIG. 2 in a halved section the upper half of the device in a present embodiment

FIG. 2 shows the wheel carrier 1 according to the invention. In contrast to FIG. 1 the two rotary parts 21, 23 are not in contact with each other via even, slanted surfaces 25, 27 to define the slanted rotation axis 24 but are supported on a rotary bearing site 31.

In addition in FIG. 2 the wheel bearing 12 is no longer directly integrated in the wheel-side carrier part 3 but rather indirectly in the wheel-side rotary part 21. In FIG. 2 the bearing outer paths and the bearing inner paths of the wheel bearing 12 are purely exemplarily shown in the inner circumference of the wheel-side rotary part 21 and directly in the outer circumference of the hub section 7 of the wheel flange 5. Correspondingly in FIG. 2 the wheel-side rotary part 21 has the additional function of an outer bearing housing of the wheel bearing 12. On the outer circumference of the wheel-side rotary part 21 the carrier part 3 is supported in vehicle transverse direction y outside on the wheel-side rotary part 21 via a bearing site 43 radially outward. The bearing site 43 has to be configured so that tilting moments can be absorbed.

In contrast to FIG. 2 in a technical implementation the wheel bearing 12 can be configured demountable, i.e., with a radially outer bearing housing, which is demountable, i.e., it is for example mounted on the outer circumference of the rotary part 21 in press fit or by screwing, and/or with a radially inner bearing housing, which can be mounted on the outer circumference of the wheel hub 5.

As can be further seen from FIG. 2 the bearing site 43 and the rotary bearing site 31 are purely exemplarily formed on axially opposing sides of the rotary part 21, wherein there between a gearwheel section 47 is positioned which is a component of the gear drive 30 (FIG. 1).

In analogy to the wheel-side carrier part 3 the axle-side guide part 17 is supported in a rotary bearing 51 radially outward on the axle-side rotary part 23. Further inwards in vehicle transverse direction y a further gearwheel section 55 is exemplarily formed on the outer circumference of the axle-side rotary part 23, which further gearwheel section is also a part of the gear drive 30. The gearwheel section 55 of the axle-side rotary part 23 is positioned in an annular space 57, which is delimited outward in vehicle transverse direction y by the rotary bearing 51 and inward by a ring gasket 59, which is arranged between the guide part 17 and the axle-side rotary part 23.

According to the invention the wheel-side carrier part 3 carries—beside for example an electronic parking brake—only the brake caliper 15 and the drive motor 29 of the wheel-side rotary part 21, but no longer the wheel bearing 12. As a result the rotary bearing 43, which is arranged between the carrier part 3 and the wheel-side rotary part 21, is removed from the force flux. As a result with regard to the occurring forces only three bearing sites are still connected in series, i.e., the wheel bearing 12, the rotary bearing 31 and the support bearing 51, but not the bearing site 43 on which the carrier part 3 is supported on the wheels-side rotary part 21. Therefore the bearing site 43 seated on the wheel-side rotary part 21 can be configured smaller because the wheel forces and moments acting at this location are much smaller. As a result of the absence of the bearing site 43 from the force flux also the camber stiffness of the bearing group increases, which makes it possible that the remaining bearings, i.e., the wheel bearing 12, the rotary bearing 31 and the support bearing 51, can be configured smaller compared to the state of the art while retaining the same camber stiffness.

In FIG. 2 a coupling rod 61 is mounted between the carrier part 3 and the guide part 17. The coupling rod acts as torque transmission element via which moments, in particular a braking moment and/or motor moments of the outer rotary drive 29, can be transmitted from the carrier part 3 to the guide part 17, i.e., while bridging the axle-side and wheel-side rotary arts parts 21, 23. The coupling rod 61 is for example arranged radially outside a circumferential rubber sleeve 63, which seals the rotary parts 21, 23 and their bearing sites against dirt.

The coupling rod 61 is positioned with its attachment sites K1 and K2 on the wheel-side carrier part 3 and on the axle-side guide part 17 so that in a braking process a directed force component F (FIG. 3 or 4) results with which the wheel-side carrier part 3 can be impinged.

Figure 4:
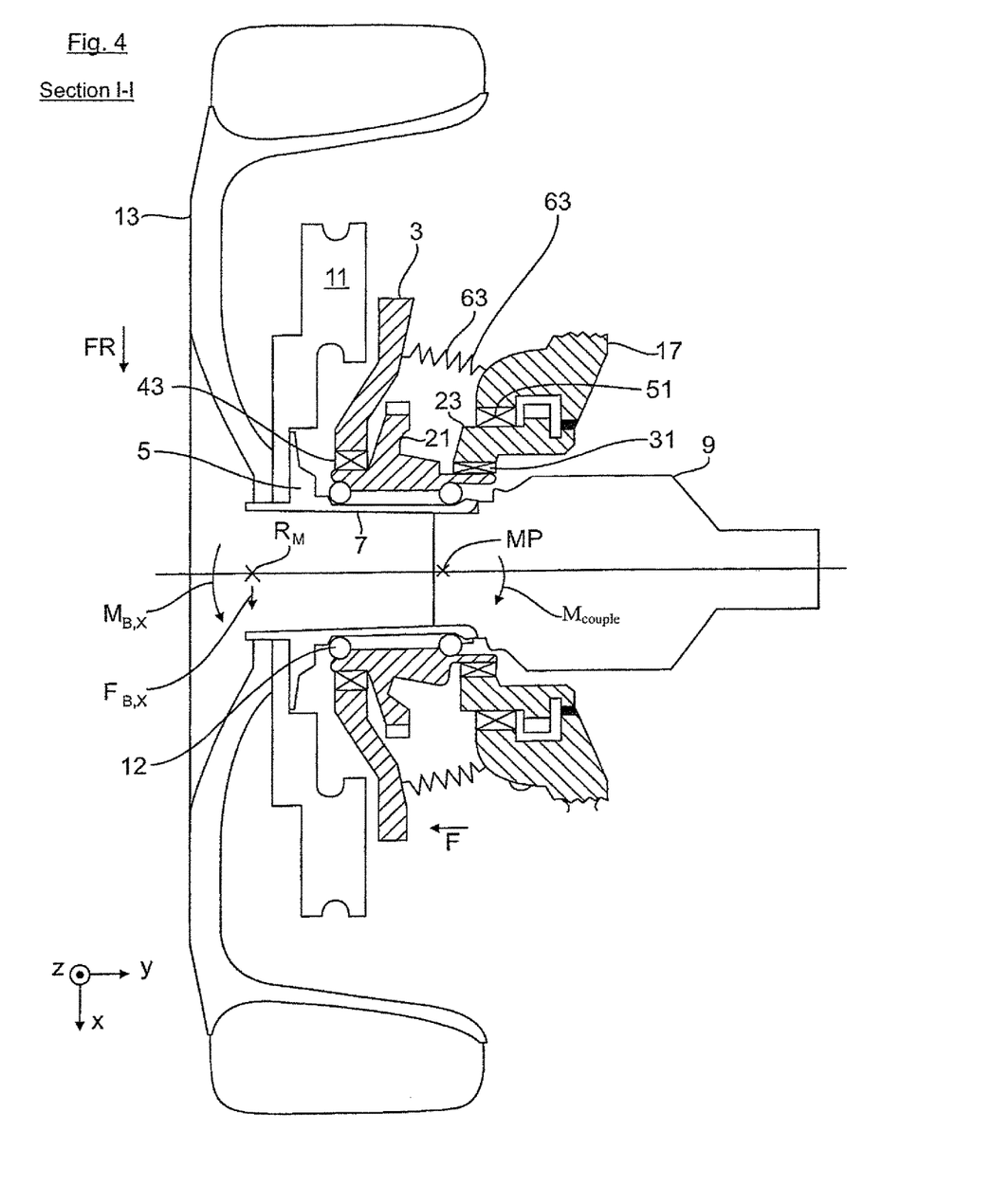
FIG. 4 a sectional view along the sectional plane I-I of FIG. 3.

During the braking process forces and moments act on the vehicle wheel 13, of which in FIG. 4 exemplarily a longitudinal braking force component $F_{a,x}$ is highlighted. The braking longitudinal force component $F_{B,X}$ acts on the wheel center RM, which in FIG. 4 is spaced apart from the instantaneous center of rotation MP by a lever arm, whereby a longitudinal moment $M_{B,x}$ is generated which pushes the vehicle wheel 13 in the direction of the toe-out. The longitudinal moment $M_{B,X}$ is transmitted to the wheel-side rotary part 21 via the hub section 7 of the wheel flange 5 and via the wheel bearing 12.

In addition during the braking process an upward oriented vertical braking force component $F_{B,Z}$ acts on the vehicle wheel 13 (rear wheel) due to the pitching compensation, by which a vertical moment $M_{B,Z}$ is generated, which leads to a change of the camber moment on the actuator.

Figure 3:
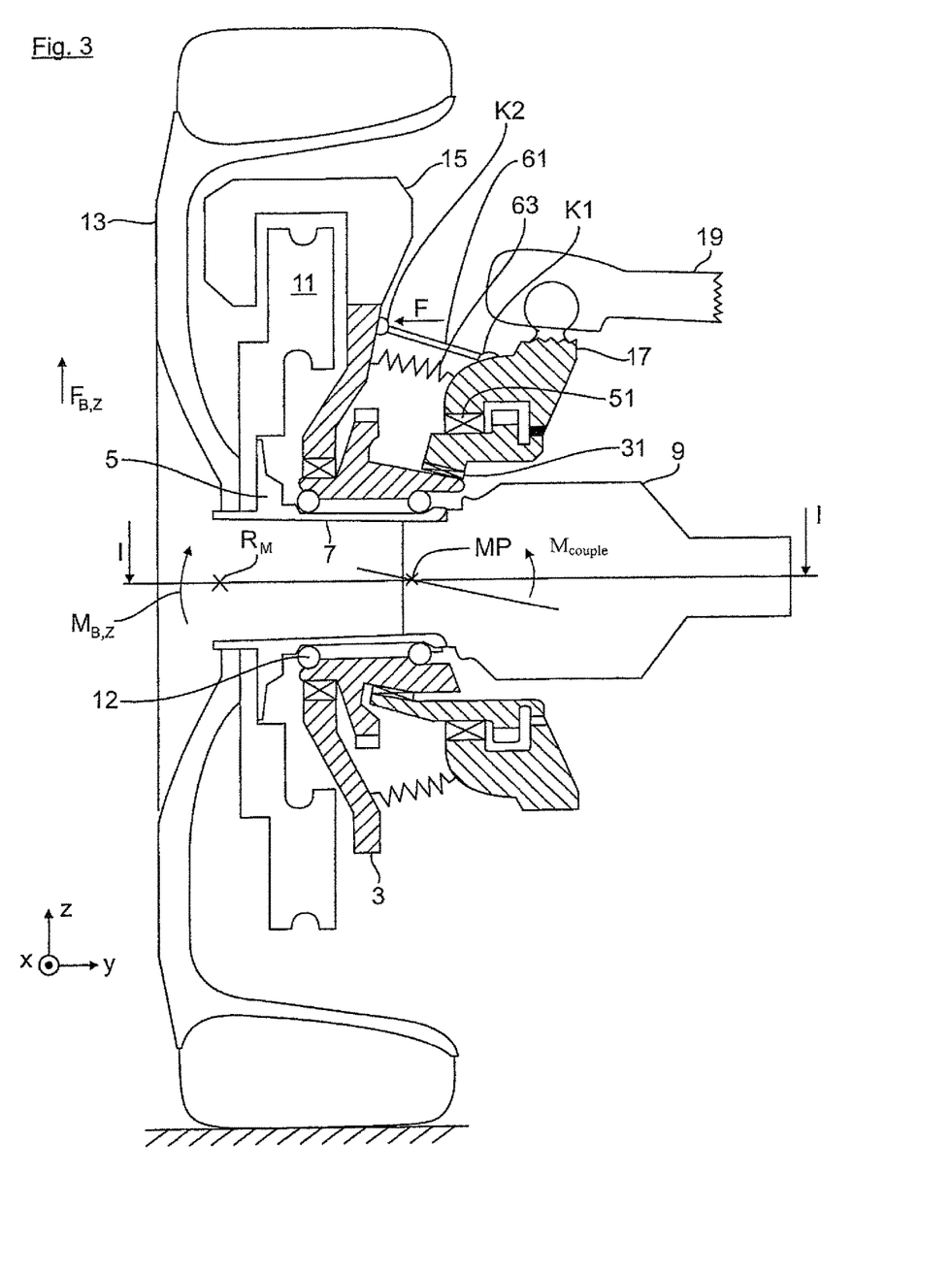
FIG. 3 a full sectional view of the device with mounted vehicle wheel.

These moments $M_{B,X}$ and $M_{B,Z}$, exemplarily highlighted in FIG. 3 or 4, add up (potentially with other moments occurring during the braking process) to a total vehicle wheel moment $M_{Tire}$, which acts on the rotary parts 21, 23 as reactive moment. The total vehicle wheel moment $M_{Tire}$ can be, but does not have to be, identical with the reaction moment, which directly acts on the rotary drive of the rotary parts 21, 23. Rather the reaction moment can be different from the total vehicle wheel moment $M_{Tire}$. This depends for example on the actual rotary positions of the rotary parts, on the actual position of the slanted, even plane formed between the rotary parts and/or the actuator transmission ratio.

In order to prevent the reaction moment acting on the rotary parts 21, 23 from leading to an inadvertent rotary movement of the rotary parts 21, 23 in the state of the art a corresponding counter control of the gear rive 30 of the wheel-side and/or the axle-side rotary part 21, 23 is performed.

In contrast thereto according to the invention the total vehicle wheel moment $M_{Tire}$ is converted in the braking process into the directed force component F by means of the coupling rod 61, with which force component the coupling rod 61 acts on the wheel-side carrier part 3 during the braking process, i.e., the wheel-side carrier part 3 is impinged on the wheel-side attachment site K2 of the coupling rod 61 with the directed force component F, whereby a total counter holding moment $M_{couple}$ is generated, which counteracts the total vehicle wheel moment $M_{Tire}$ so as to minimize the reaction moments on the rotary parts 21, 23.

The exact position of the attachment sites K1, K2 of the coupling rod 61 depends on the geometric conditions of the wheel carrier and can be calculated by using the technical literature (for example the textbook "joints and universal shafts" by Schmelz, Seherr-Thoss, Aucktor). For example the positions of the attachment sites K1, K2 of the coupling rod 61 can be determined so that in the complete movement space of the vehicle wheel 13, i.e., for example in a tow angular range of +/−6.5 and a camber angular range between −5 and +2.5 the remaining moment that acts during the bring process in the rotary parts 21, 23 is as small as possible. The remaining moment is calculated from the difference between the counter moment $M_{couple}$ exerted by the coupling rod 61 and the above-mentioned total vehicle wheel moment $M_{Tire}$, i.e., while taking an actuator transmission ratio in the operating point of the respective force component into account.

Figure 5A:
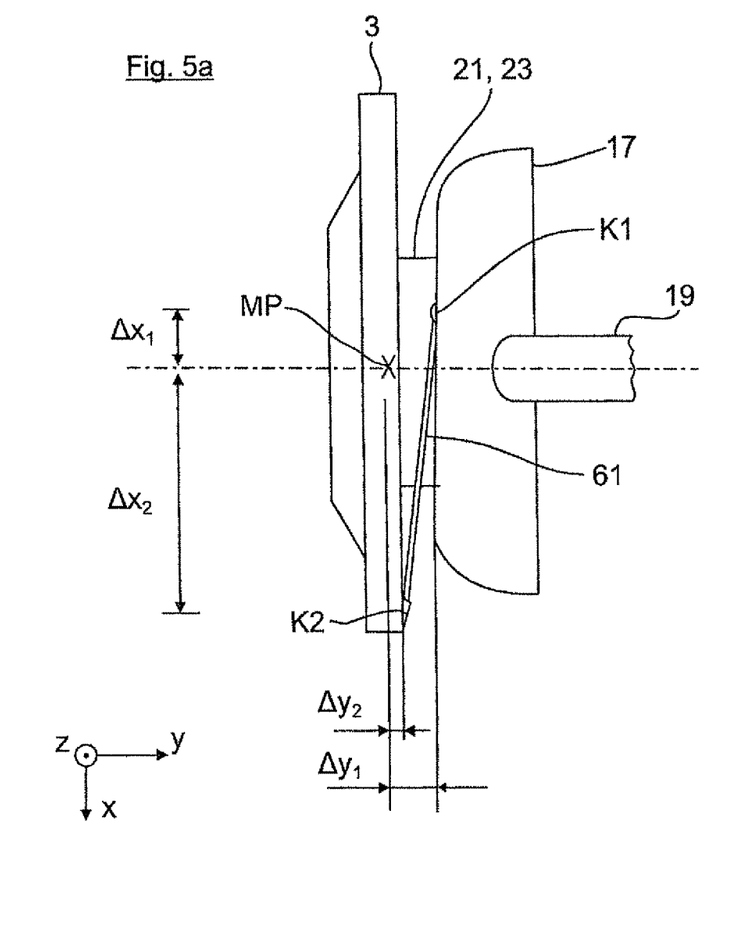
FIGS. 5a and 5b the wheel carrier respectively in a view from above and in a view from behind.
Figure 5B:
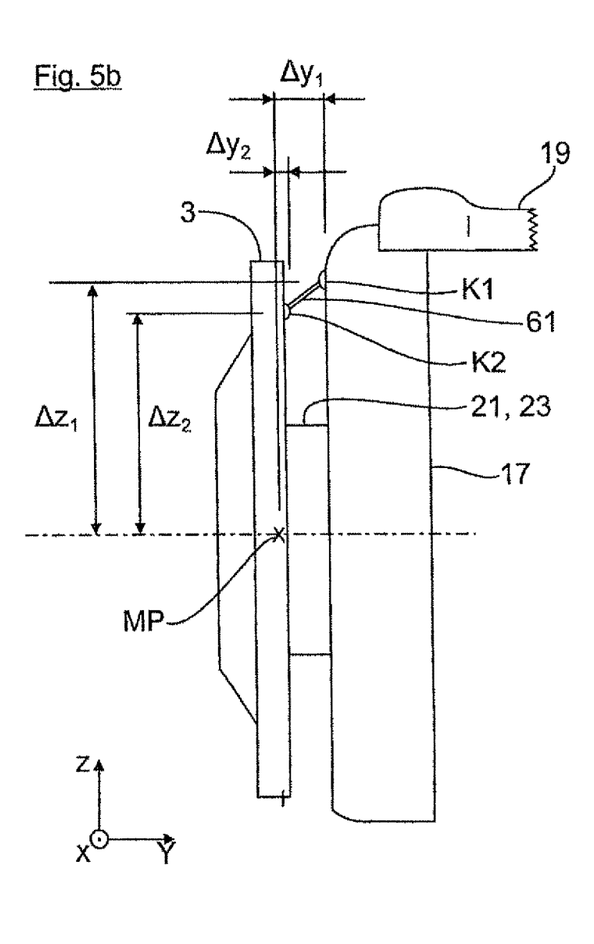
Figure 6:
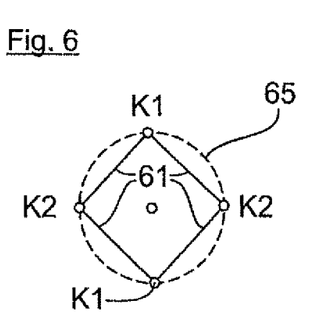
FIGS. 6 to 9 respectively schematic representations of different coupling arrangements between the wheel-side carrier part and the axle-side guide part of the wheel carrier.

Important for the position of the coupling rod attachment sites K1, K2 are their distances to the instantaneous center of rotation MP in the spatial directions x, y, z as illustrated in FIGS. 5a and 5b. Accordingly when viewed in vehicle transverse direction y the attachment sites K1, K2 are positioned at distances ☐$y_1$, ☐$y_2$ within the instantaneous center of rotation MP. In addition the attachment sites K1, K2 are when viewed in vehicle longitudinal direction x positioned in front of and behind the instantaneous center of rotation MP by distances ☐$y_1$, ☐$y_2$. In the vehicle vertical direction z the attachment sites K1, K2 are positioned outside (i.e., in FIG. 5b above) the instantaneous center of rotation MP. As can be further seen from FIGS. 5a and 5b the attachment sites K1 and K2 of the coupling rod 61 are when viewed in vehicle transverse direction y, not oriented aligned with each other but are spaced part form each other in vehicle longitudinal direction x by a distance.

The following FIGS. 6 to 9 show very schematic representations, which illustrate further variants of the torque transmission element 61. Accordingly according to FIG. 6 not only a single coupling rod may be provided but rather overall up to four coupling rods which are arranged distributed over the circumference of the wheel axle and are attached on wheel-side and axle-side coupling sites K1, K2. The coupling sites K1 and K2 are all arranged when viewed in vehicle transverse direction y on a circular line 65 which for example represents exemplarily the outer contour of a gimbal of a universal joint which requires significantly more mounting space compared to the coupling rods, as it is for example arranged in DE 10 2009 058 489 A1 between the wheel-side carrier part and the axle-side guide part 17.

Figure 7:
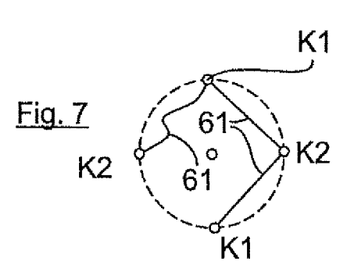
Figure 8:
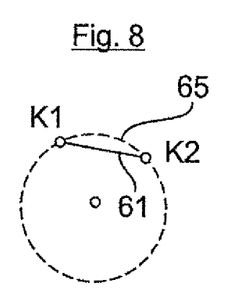
Figure 9:
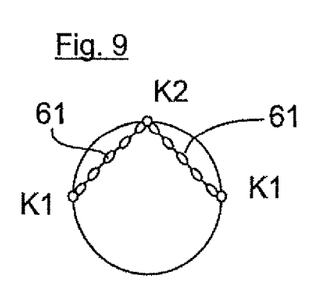

In FIG. 7 exemplarily overall three coupling rods 61 are provided, two of which extend straight, while the third coupling rod 61 for example has an S-bend due to mounting space conditions. In FIG. 8 only one coupling rod 61 is shown whose position substantially corresponds to the coupling rod position in FIGS. 2 to 5. In FIG. 9 the torque transmission element 61 is not formed by a coupling rod but rather by coupling members, for example chains or pull straps, which can only be subjected to tensile stress.

What is claimed is:

1. A device for adjusting camber and/or toe of a vehicle wheel of a motor vehicle, comprising:
a wheel carrier including a wheel-side carrier part, an axle-side guide part and rotary parts arranged between the wheel-side carrier part and the axle-side guide part to thereby define a wheel-side rotary part and an axle-side rotary part, said rotary parts being supported on a common bearing site for rotation relative to each other about a rotation axis, said wheel-side carrier part being rotatable about said rotation axis about an instantaneous center of rotation for toe or camber adjustment of the vehicle wheel and supporting a brake caliper interacting with a brake disc of the vehicle wheel; and
a torque bridge configured as a torque transmission element which supports the wheel-side carrier part on the axle-side guide part when a braking moment acts on the wheel-side carrier part during a braking process, and which when supporting the wheel-side carrier part on the axle-side guide part generates a directed force component with which the wheel-side carrier part is impingable, said torque transmission element being constructed as at least one coupling rod, which is subjectable to tensile and compressive forces.

2. The device of claim 1, wherein the torque transmission element is constructed for articulate connection on a wheel-side attachment site on the wheel-side carrier part and on an axle-side attachment site on the axle-side guide part.

3. The device of claim 2, wherein the wheel-side attachment site and the axle-side attachment site of the torque transmission element are positioned so that the torque transmission element is seizable between the carrier part and the guide part.

4. The device of claim 2, wherein the wheel-side attachment site and the axle-side attachment site of the torque transmission element are spaced apart from the instantaneous center of rotation in three spatial directions.

5. The device of claim 2, wherein the wheel-side attachment site and the axle-side attachment site of the torque transmission element when viewed in vehicle transverse direction are offset from the instantaneous center of rotation inwards by respective distances.

6. The device of claim 2, wherein the wheel-side attachment site and the axle-side attachment site when viewed in vehicle longitudinal direction are positioned before or behind the instantaneous center of rotation by respective distances.

7. The device of claim 2, wherein the wheel-side attachment site and the axle-side attachment site are offset from the instantaneous center of rotation (MP) in vehicle vertical direction by respective distances.

8. The device of claim 2, wherein the torque transmission element is constructed for articulate connection on a wheel-side attachment site on the wheel-side carrier part and on an axle-side attachment site on the axle-side guide part, the wheel-side attachment site and the axle-side attachment site of the torque transmission element when viewed in vehicle transverse direction being offset from the instantaneous center of rotation inwards by respective distances.

9. The device of claim 1, wherein during the braking process, the torque transmission element generates a counter moment to reduce a reaction moment, resulting from a total vehicle wheel moment and being conducted from the vehicle wheel to the rotary parts.

10. The device of claim 1, wherein a wheel center of the vehicle wheel and the instantaneous center of rotation are spaced apart from each other by a lever arm.

11. The device of claim 1, further comprising a wheel bearing integrated in the wheel-side rotary part.

12. The device of claim 11, wherein in the wheel bearing of the wheel carrier a wheel hub section of a wheel flange which carries the vehicle wheel is rotatably supported.

13. The device of claim 12, wherein the carrier part is arranged radially outside the wheel-side rotary part.

14. The device of claim 13, wherein the carrier part is supported on the wheel-side rotary part via a radially inner bearing site.

15. The device of claim 12, wherein the wheel bearing is configured demountable and includes a radially inner bearing housing and a demountable radially outer bearing housing, said demountable outer bearing housing being mounted on an outer circumference of the wheel hub or an inner circumference of the wheel-side rotary part.

16. The device of claim 15, wherein the radially, outer bearing housing is mounted by press fit or by screwing.

17. The device of claim 12, wherein the wheel-side rotary part directly forms the radially outer bearing housing of the wheel bearing, and wherein radially inward of the rotary part, which forms the outer bearing housing a wheel hub section of a wheel flange, which carries the vehicle wheel is rotatably supported.

18. The device of claim 1, wherein the carrier part is supported in the wheel-side rotary part via a bearing site.

19. A device for adjusting camber and/or toe of a vehicle wheel of a motor vehicle, comprising:
a wheel carrier including a wheel-side carrier part, an axle-side guide part and rotary parts arranged between the wheel-side carrier part and the axle-side guide part to thereby define a wheel-side rotary part and an axle-side rotary part, said rotary parts being supported on a common bearing site for rotation relative to each other about a rotation axis, said wheel-side carrier part being rotatable about said rotation axis about an instantaneous center of rotation for toe or camber adjustment of the vehicle wheel and supporting a brake caliper interacting with a brake disc of the vehicle wheel; and
a torque bridge configured as a torque transmission element which supports the wheel-side carrier part on the axle-side guide part when a braking moment acts on the wheel-side carrier part during a braking process, and which when supporting the wheel-side carrier part on the axle-side guide part generates a directed force component with which the wheel-side carrier part is impingable, said torque transmission element including at least one coupling member, which is solely subjectable to tensile forces but not to compressive force.

20. The device of claim 19, wherein the torque transmission element is constructed as a chain or a pull strap.

21. The device of claim 19, wherein a wheel center of the vehicle wheel and the instantaneous center of rotation are spaced apart from each other by a lever arm.

22. The device of claim 19, wherein the torque transmission element is constructed for articulate connection on a wheel-side attachment site on the wheel-side carrier part and on an axle-side attachment site on the axle-side guide part, the wheel-side attachment site and the axle-side attachment site of the torque transmission element being spaced apart from the instantaneous center of rotation in three spatial directions.

23. The device of claim 19, further comprising a wheel bearing integrated in the wheel-side rotary part, wherein in the wheel bearing of the wheel carrier a wheel hub section of a wheel flange which carries the vehicle wheel is rotatably supported, said wheel bearing being configured demountable and including a radially inner bearing housing and a demountable radially outer bearing housing, said demountable outer bearing housing being mounted on an outer circumference of the wheel hub or an inner circumference of the wheel-side rotary part.

\* \* \* \* \*